July 24, 1951     M. I. ZWELLING     2,561,456

METHOD OF IMPREGNATING TRANSFORMERS

Filed July 26, 1946

INVENTOR.
MARTIN I. ZWELLING
BY
ATTORNEY

Patented July 24, 1951

2,561,456

UNITED STATES PATENT OFFICE 2,561,456

METHOD OF IMPREGNATING TRANSFORMERS

Martin I. Zwelling, Zanesville, Ohio, assignor to McGraw Electric Company, a corporation of Delaware Application July 26, 1946, Serial No. 686,489

2 Claims. (Cl. 29—155.56)

This invention relates to a method of impregnating transformers.

In impregnating transformers considerable difficulty has been encountered in thoroughly drying out the transformer and in preventing the formation of voids which later will give considerable trouble in the operation of the transformer, particularly distribution or high voltage transformers.

Objects of this invention are to provide a novel method of impregnating and drying out transformers which insures a thorough drying out of the transformer and which prevents the formation of voids. The method is applicable to transformers installed in their own casings or housings.

Further objects are to provide a method of impregnating transformers in which the transformer mounted in its own casing or tank is heated both internally and externally and is thoroughly dried out, the casing being hermetically sealed and a vacuum applied to the casing to remove the air and moisture from the transformer while it is being heated.

A particular object of this invention is to provide a method whereby the encased transformer is heated internally by the $I^2R$ losses in certain windings of the transformer, one of the windings being supplied with alternating current and the remaining windings being short-circuited, and at the same time to provide externally applied heat so as to prevent condensation on the interior walls of the transformer tank or casing and also to keep the temperature gradient between the several parts of the transformer as low as possible throughout the process.

An embodiment of the invention is shown in the accompanying drawings, in which.

Figure 1:
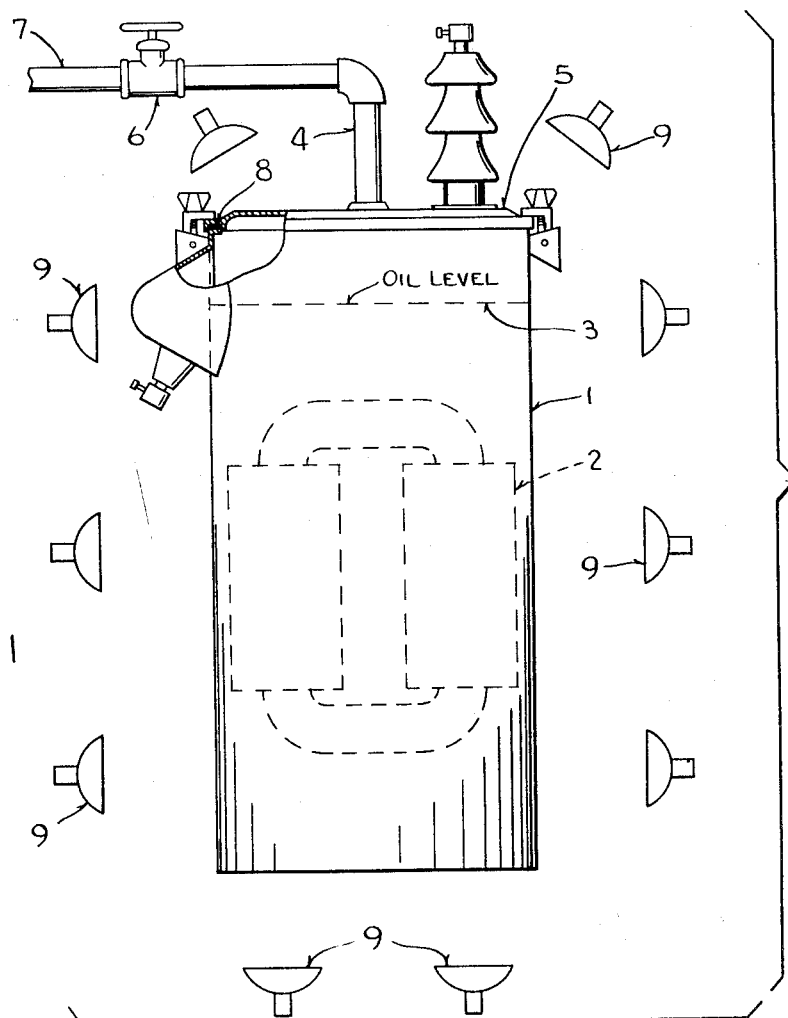
Figure 1 is a view of a transformer connected up so that the method contemplated by this invention may be followed.

In practicing this invention, the permanent casing 1 of the transformer 2 is partially filled with oil to approximately the level indicated by the reference character 3. Thereafter a pipe 4 is screwed into a suitable opening in the top or cover 5 of the casing or tank 1 and is connected through a valve 6 with a source of vacuum 7.

The casing 1 is hermetically sealed; for example, a gasket 8 may be positioned between the cover 5 and the main body of the tank 1 of the transformer and the cover clamped in place.

Figure 2:
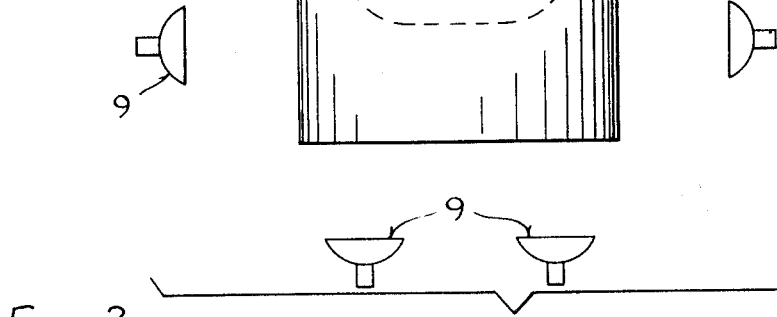
Figure 2 is a wiring diagram of the transformer showing temporary connections while the transformer is being processed.

After the transformer casing has been connected to the source of vacuum the casing 1 is externally heated in any suitable manner as by means of the infra-red heaters 9 and the transformer is heated internally. This internal heating of the transformer is accomplished by short-circuiting all but one of the windings of the transformer 2, as shown in Figure 2, and supplying alternating current to the remaining winding. The voltage at the input side of the transformer is adjusted to the proper value so as to cause considerable heating of the transformer but without doing any damage thereto. Thus it will be seen that the transformer is internally heated through the $I^2R$ losses and through other losses and is also externally heated as heat is conducted inwardly from the outer walls of the casing or tank 1 to the oil and is transferred to the transformer. It is intended that the heat be maintained at such a value that no damage is done to the insulation of the transformer. In addition to this the heat applied exteriorly of the tank or casing 1 is of such value that it will not cause a rise in temperature to a point where it would damage the paint usually applied to the outer surface of the casing. While this heating is taking place, the valve 6 is left open and vacuum of a relatively high value is maintained within the tank or casing 1. This draws out all of the moisture given off by the heated transformer. Also any moisture that may be present in the oil is eliminated by this process. The vacuum is maintained as low as possible. For example, one inch of mercury absolute pressure or a lesser pressure has been found satisfactory.

The heating takes place for one or more hours while the vacuum is applied to insure a complete dehydration of the transformer and of the oil. The temperature may be maintained at 100° C. or even higher for a limited time.

In addition to the above effects, it is to be noted that all of the air pockets are removed from the interstices of the transformer due to the vacuum.

After the heating and the application of vacuum has continued for a sufficient length of time as hereinabove set forth, the vacuum is broken and the oil is forced into all of the interstices of the transformer by atmospheric pressure acting on the upper surface of the oil and prevents the formation of voids in any part thereof. In addition to this, the oil and the transformer are thoroughly freed of any moisture by the process hereinabove set forth.

It is to be understood that the external heating of the housed transformer may be accomplished in other ways from that shown. Also it is to be noted that the high voltage winding may be short-circuited and all but one of the secondary windings short-circuited. The remaining secondary winding is then connected to a suitable source of alternating current so as to properly load the several windings.

It is to be noted also that when the vacuum is broken near the completion of the process of drying and impregnating the transformer, that the atmospheric pressure forces the oil into all of the crevices of the transformer and thus insures against the formation of voids. The opening in which the pipe 4 was screwed is covered or closed in any suitable manner.

It is to be noted that the external heating of the casing prevents radiation of heat which would otherwise occur if the transformer alone were heated. Further than this, no condensation of moisture can take place on the walls of the casing as these walls are maintained hot.

It is to be noted also that the method of heating hereinabove set forth minimizes the temperature gradient between the several parts of the apparatus.

It is to be noted that the assembled transformer does not have to be placed in an autoclave or other vacuum chamber. Instead the permanent casing of the transformer is employed as the vacuum chamber during the evacuation of the apparatus and consequently the casing is freely exposed to the outside air. This greatly simplifies the impregnation of an apparatus of this type.

Although this invention has been described in considerable detail, it is to be understood that such description is intended as illustrative rather than limiting, as the invention may be variously embodied and is to be interpreted as claimed.

I claim:

1. The method of impregnating transformers which are subsequently sealed in permanent casings, said method comprising placing the transformer in the permanent casing, putting oil in the permanent casing, temporarily sealing the casing, producing a vacuum in the casing, electrically loading the transformer to cause heating thereof, applying heat to the exterior of the casing, maintaining the heating and vacuum until the transformer is thoroughly dry, breaking the vacuum so that atmospheric pressure acts upon the upper surface of the oil and forces the oil into all the interstices of the transformer, leaving the transformer in the permanent casing, and subsequently sealing the permanent casing.

2. The method of impregnating transformers which are subsequently sealed in permanent casings, said method comprising placing the transformer in the permanent casing, putting oil in the permanent casing, temporarily sealing the casing, producing a vacuum in the casing, electrically loading the transformer to cause heating thereof, heating the casing from its exterior, maintaining the heating and vacuum until the transformer is thoroughly dry, breaking the vacuum so that atmospheric pressure acts upon the upper surface of the oil and forces the oil into all the interstices of the transformer, leaving the transformer in the permanent casing, and subsequently sealing the permanent casing.

MARTIN I. ZWELLING.

REFERENCES CITED

The following references are of record in the file of this patent:

UNITED STATES PATENTS

| Number | Name | Date |
|---|---|---|
| 691,675 | Thomson | Jan. 21, 1902 |
| 1,163,342 | Hurley et al. | Dec. 7, 1915 |
| 1,902,575 | Nichols | Mar. 21, 1933 |
| 2,063,346 | Scott et al. | Dec. 8, 1936 |
| 2,120,816 | Schnoll | June 14, 1938 |